United States Patent
Rouse et al.

(10) Patent No.: US 6,772,976 B1
(45) Date of Patent: Aug. 10, 2004

(54) SENSOR FOR MEASURING WIND ANGLE

(75) Inventors: Gordon F. Rouse, Arden Hills, MN (US); Paul B. Dupuis, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/120,034

(22) Filed: Apr. 10, 2002

(51) Int. Cl.$^7$ ............................. B64C 39/00; G01L 7/00
(52) U.S. Cl. ..................... 244/1 R; 73/170.14; 116/265
(58) Field of Search ....................... 244/1 R; 73/170.14, 73/181, 170.05, 170.06, 170.07; 701/6, 7, 14; 116/265

(56) References Cited

U.S. PATENT DOCUMENTS

| | | | |
|---|---|---|---|
| 2,512,278 A | | 6/1950 | Harry ............................ 73/180 |
| 2,519,015 A | * | 8/1950 | Bensen ........................ 340/966 |
| 2,637,294 A | * | 5/1953 | Gehrig ......................... 244/1 R |
| 2,661,624 A | * | 12/1953 | Bechberger et al. ........... 73/180 |
| 4,674,704 A | * | 6/1987 | Altoz et al. ................. 244/1 R |
| 5,323,649 A | * | 6/1994 | Carlson ..................... 73/170.07 |
| 5,442,958 A | * | 8/1995 | Hagen ...................... 73/170.02 |
| 5,546,799 A | | 8/1996 | Parker ...................... 73/170.11 |
| 5,585,557 A | | 12/1996 | Loschke et al. ........... 73/170.14 |
| 5,616,860 A | | 4/1997 | Morohoshi et al. ....... 73/170.14 |
| 5,988,562 A | | 11/1999 | Linick ........................ 244/3.21 |
| 6,073,084 A | | 6/2000 | Le Tron ....................... 702/94 |
| 6,131,055 A | | 10/2000 | Patrick ........................... 701/6 |
| 6,253,126 B1 | | 6/2001 | Palmer ......................... 701/14 |
| 6,253,166 B1 | | 6/2001 | Whitmore et al. ............. 703/2 |
| 6,273,370 B1 | | 8/2001 | Colgren ...................... 244/181 |
| 6,279,393 B1 | | 8/2001 | McLaughlin ............. 73/170.14 |
| 6,497,142 B1 | * | 12/2002 | Sporhase ................. 73/170.01 |

FOREIGN PATENT DOCUMENTS

DE           1273860        7/1968

\* cited by examiner

*Primary Examiner*—Robert P. Swiatek
(74) *Attorney, Agent, or Firm*—Schwegman, Lundberg, Woessner & Kluth, P.A.

(57) ABSTRACT

A differential pressure-induced airflow based approach is used to measure Angle-Of-Attack (AOA) or Angle-Of-Sideslip (AOS) for an aircraft. Ports on opposing sides of an aircraft fuselage are coupled by an airway incorporating a mass airflow sensor. As the relative wind's angle of incidence changes direction with respect to the aircraft's longitudinal axis or wing chord, a differential pressure is created. The differential pressure induces an airflow between the ports whose magnitude is measured by a mass airflow sensor. The resulting airflow is a function of the respective AOA or AOS. The measured airflow and air data computer supplied parameters of airspeed (or dynamic pressure) and altitude (or static pressure) are utilized by an algorithm that reduces the data into angular AOA or AOS measurements.

22 Claims, 3 Drawing Sheets

SENSOR FOR MEASURING WIND ANGLE

FIELD OF THE INVENTION

The present invention relates measuring Angle-Of-Attack (AOA) or Angle-Of-Sideslip (AOS) for an aircraft, and in particular to the use of mass-airflow-based differential pressure for such measuring.

BACKGROUND OF THE INVENTION

In aircraft applications, it is difficult to measure Angle-Of-Attack (AOA) or Angle-Of-Sideslip (AOS) accurately at low airspeeds with conventional vane, cone, or differential pressure measurement approaches in common use. The means that are suitable for accurately measuring low airspeed and AOS are not compatible with operating over the large speed range of tactical Vertical Take-Off and Landing (VTOL)/Short Take-Off and Vertical Landing (STOVL) aircraft. Such means also lack the necessary attributes that insure covertness such as a low radar cross-section (RCS). Conventional AOA & AOS sensing approaches lack the sensitivity and dynamic range required to accurately measure AOA or AOS at low airspeeds since they are pressure based. Since dynamic pressure is proportional to velocity squared, these techniques work well at moderate to high airspeeds, but are generally unusable below 50 knots airspeed. Modern VTOL/STOVL aircraft have a need for accurately measuring AOS and AOA at speeds below 50 knots.

SUMMARY OF THE INVENTION

A mass-airflow-based differential pressure measurement approach is used to sense Angle-Of-Attack (AOA) or Angle-Of-Sideslip (AOS). Sensing ports on opposing sides of an aircraft fuselage are coupled by an enclosed airflow path incorporating a mass airflow sensor. As the longitudinal axis of the aircraft changes direction with respect to the incident airflow, a differential pressure results from one port to the other. The mass airflow sensor detects a resulting airflow that is a function of the AOA or AOS.

In one embodiment, the ports comprise multiple small orifices that feed a common plenum. A solid state mass airflow sensor is placed in the pneumatic plumbing between the pairs of flush ports, The port's external orifices are small to minimize the possibility of debris, such as insects, ice or other foreign matter from disabling the port. Even if one of the orifices becomes obstructed, the numerous redundant orifices connected to the plenum continue to allow airflow due to the differential pressure.

In one embodiment for angle of sideslip (AOS) measurement, the flush ports are mounted just in front of a cockpit of an aircraft, laterally displaced in mirrored locations from the centerline of the aircraft. The aircraft comprises a Short Take-Off and Vertical Landing (STOVL) aircraft, however, the invention may be extended to any aircraft.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
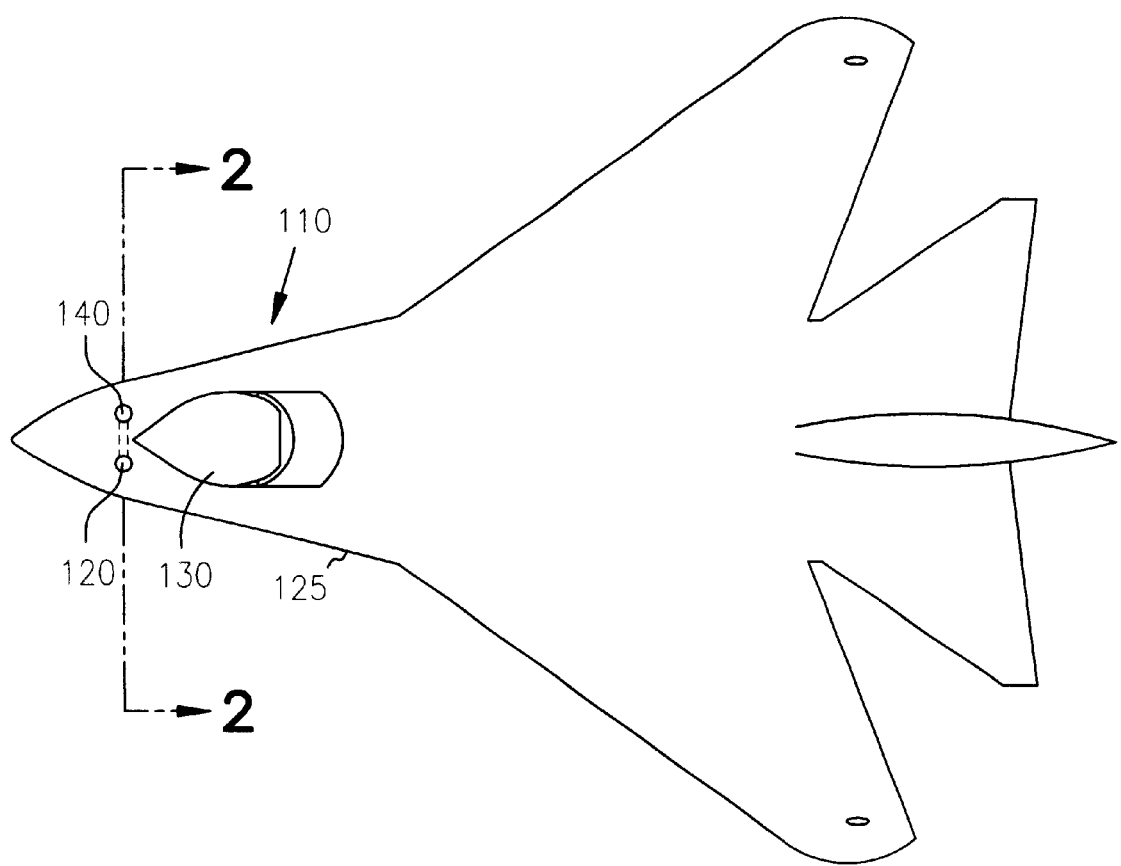
FIG. 1 is a top view representation of an aircraft showing locations for opposing ports for detection of AOS.
Figure 4:
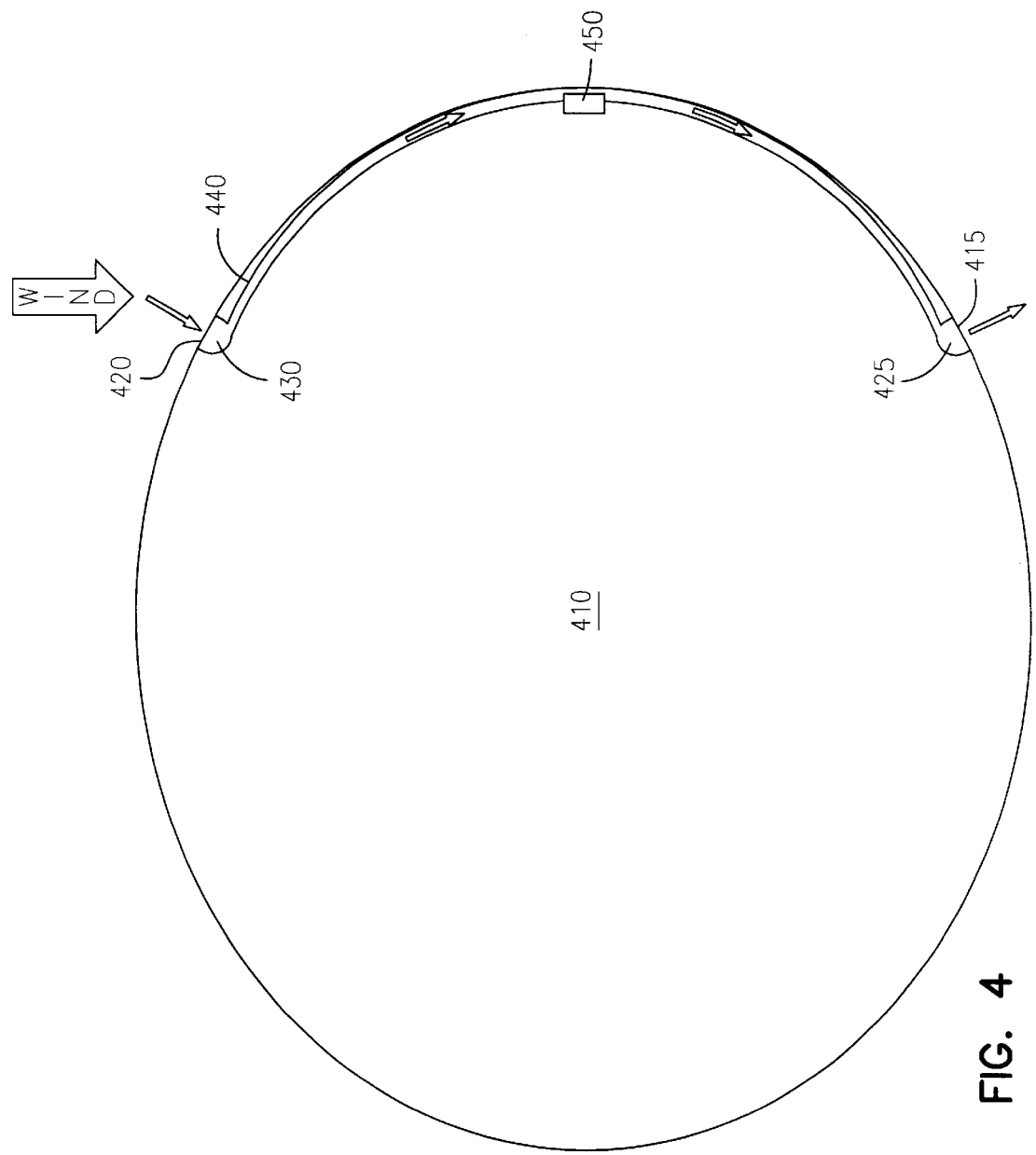
FIG. 4 is a frontal cross-section representation of an aircraft showing locations for opposing ports for detection of AOA.

FIG. 1 is a top view representation of an aircraft indicated generally at 110 incorporating the present invention. A first port is shown at 120 on a fuselage 125 of aircraft 110. It is located just in front of cockpit 130 in one example embodiment. A second opposing port 140 is shown on the fuselage at 125 in front of the cockpit 130. In this example for AOS measurement, the first and second ports are located on opposite sides of the aircraft, and positioned as mirror images on each side of the aircraft centerline. For AOA measurement, the sensing ports will use a vertical, typically non-mirrored displacement (due to airframe vertical asymmetry) above and below the aircraft centerline as shown in FIG. 4 in lieu of the lateral displacement used for AOS. Other positions may also be selected.

Figure 2:
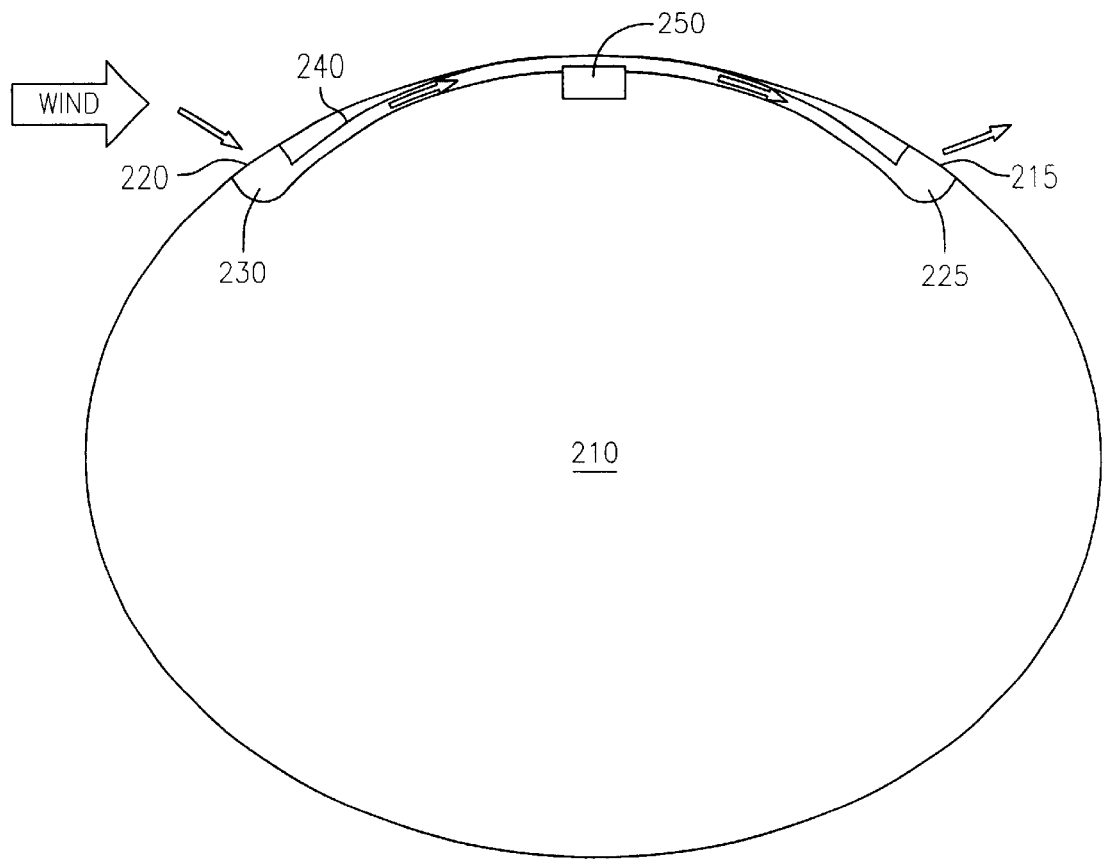
FIG. 2 is a frontal cross section of the fuselage of the aircraft of FIG. 1 at the opposing ports.
Figure 3:
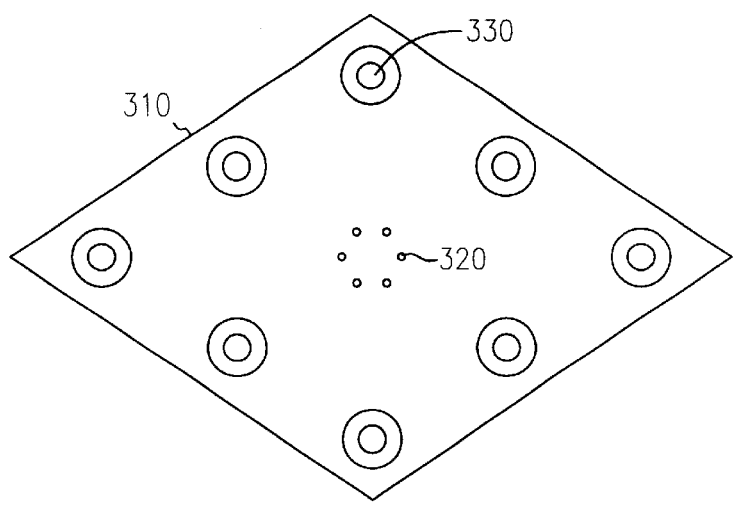
FIG. 3 is a top view representation of a cover for an opposing port of FIG. 1.

A cross section of fuselage 125 is shown at 210 in FIG. 2. The cross section is taken at ports 120 and 140. In one embodiment, the ports are integral within the flush plates 215 and 220. The port's plenums 225 and 230, are coupled by a pneumatic passage such as a pipe, or other pneumatic plumbing 240.

At approximately the midpoint between the two ports, a mass airflow sensor 250 is positioned to measure the mass airflow between the ports. Airflow between the ports is caused by differential pressure resulting from the relative wind that is incident upon the aircraft at an angle relative to the aircraft's longitudinal axis for AOS or wing chord for AOA. The mass airflow is a function of the Angle-Of-Attack (AOA) or Angle-Of-Sideslip (AOS) of the fuselage with respect to direction of flight, the aircraft forward speed and pressure altitude. In other embodiments, the airflow sensor may be located in different parts of the pneumatic plumbing.

The locations of the sensing ports may vary in different embodiments. The example locations shown in FIG. 1 are selected to optimize the sensitivity to the relative wind angle and meet airframe-specific constraints. The locations are also desired to be a mirror image of each other to ensure similar magnitudes of pressure for both positive and negative relative wind angles. Further, the typical locations in any embodiment are selected to ensure that they are interconnected by the shortest practical length of pneumatic plumbing. Just in front of the cockpit is an example of a location that meets such criteria.

A predefined angular displacement of the ports relative to each other ensures a difference in pressure occurs for given AOS or AOA. In other embodiments, the ports may be located further forward on the nose of the aircraft. In such locations, the ports may have the pneumatic plumbing extending directly between them, or, following the contour of the fuselage or otherwise as dictated by airframe installation constraints.

Further detail of the ports is provided in a top view of a port 310 with its integral plenum. Port 310 has a plurality of orifices 320 in a circular "salt-shaker" like arrangement. The port is mounted flush with the fuselage of the aircraft within a prescribed installation detail. It is retained by a plurality of flush rivets, screws or bolts 330.

In one embodiment, the orifices are formed as by drilling ports in the plate. The orifices range in diameter from 0.03 inches to 0.05 inches and are spaced apart approximately two inches or as otherwise desired. Orifices of such a small size minimize the possibility of debris, such as insects, ice or other foreign matter, from obstructing the port. The larger orifices create a higher airflow that results in the mass airflow sensor providing a higher sensitivity for different angles. Other size orifices provide differing sensitivities.

In one embodiment, the mass airflow sensor comprises a commercially available mass airflow sensor, such as a thin film, thermally isolated bridge structure containing heater and temperature sensing elements. This embodiment has the attributes of being self-draining and heated to minimize water or ice contamination.

In order to determine the AOA or AOS using this approach, experimental data is obtained by creating a mock up of a nose section of the aircraft having the sensor incorporated therein. A wind tunnel is then used to provide a controlled environment. Varying airspeed, AOA, AOS, and static pressure, while monitoring the mass airflow sensor output provides raw measurements. These are algorithmically reduced into a function of the input variables. This function, in turn uses raw mass airflow data provided by this sensing approach in conjunction with the airspeed (or Qc) and altitude (or static pressure) measurements provided by the aircraft's air data computer to calculate the resultant AOA or AOS.

A cross section of fuselage 125, is shown at 410 in FIG. 4. The cross section is taken at a pair of vertically displaced ports is utilized for AOA measurements. In one embodiment, the ports are integral within the flush plates 415 and 420. The port's plenums 425 and 430, are coupled by a pneumatic passage such as a pipe or other pneumatic plumbing 440.

At approximately the midpoint between the two ports, a mass airflow sensor 450 is positioned to measure the mass airflow between the ports. Airflow between the ports is caused by differential pressure resulting from the relative wind that is incident upon the aircraft at an angle to the aircraft's wing chord for AOA. The mass airflow is a function of the AOA of the fuselage with respect to direction of flight, the aircraft forward speed and pressure altitude. In other embodiments, the airflow sensor may be located in different parts of the pneumatic plumbing.

Conclusion

The arrangement of ports, pneumatic plumbing, and a mass airflow sensor and its integration into an airframe and measurement system is the essence of this invention. Although the examples cite a VTOL/STOVL aircraft, which can fly at very low speeds, such as under 50 miles per hour in a typical embodiment, the approach extends to other vehicles such as helicopters and other diverse applications that may similarly use the present invention to measure the relative wind angle.

The measured airflow and air data computer supplied parameters of airspeed (or dynamic pressure) and altitude (or static pressure) are utilized by an algorithm that reduces the data into angular AOA or AOS measurements. This computing may occur within air data computer hardware, a virtual air data computer software application running on another computer such as a flight control computer, or elsewhere.

What is claimed is:

1. An aircraft comprising:
    a first port positioned on a first side of the aircraft's fuselage;
    a second port positioned on a second side of the aircraft's fuselage;
    a pneumatic passage interconnecting the two ports; and
    a mass airflow sensor positioned in the passage interconnecting the ports.

2. The aircraft of claim 1 wherein the first and second ports comprise subassemblies mounted substantially flush with the aircraft, wherein the ports comprise one or more orifices.

3. The aircraft of claim 1 wherein the airflow sensor comprises a thin film mass airflow sensor.

4. The aircraft of claim 1 wherein the first and second ports substantially mirror each other on opposite sides of the aircraft in either a port-starboard or top-bottom arrangement.

5. The aircraft of claim 4 wherein the first and second ports are located proximate the front of the aircraft.

6. The aircraft of claim 1 wherein the pneumatic passage comprises a tube or other pneumatic plumbing between the first and second ports.

7. The aircraft of claim 6 wherein the pneumatic passage follows the contour of the aircraft.

8. The aircraft of claim 6 wherein the pneumatic passage follows a substantially direct line between the first and second ports.

9. A portion of an aircraft comprising:
    means for conveying airflow between a first port on a first surface of the nose section and a second port on a second surface of the nose section; and
    means for sensing airflow between the ports.

10. The portion of the aircraft of claim 9 wherein the first and second ports comprise subassemblies mounted substantially flush with the aircraft, wherein the subassemblies comprise one or more orifices and an integral plenum connecting the orifices in each individual port.

11. The portion of the aircraft of claim 10 wherein the means for sensing airflow comprises a thin film mass airflow sensor.

12. The aircraft of claim 10 wherein the pneumatic passage comprises a tube or other pneumatic plumbing between the first and second ports.

13. The aircraft of claim 12 wherein the pneumatic passage follows the contour of the aircraft.

14. The aircraft of claim 12 wherein the pneumatic passage follows a substantially direct line between the first and second ports.

15. The portion of the aircraft of claim 10 wherein the first and second ports substantially mirror each other on opposite surfaces of the portion of aircraft.

16. The portion of the aircraft of claim 15 wherein the first and second ports are located proximate the front of the aircraft.

17. The portion of the aircraft of claim 16 wherein the first and second ports are located on a wing or tail of the aircraft.

18. A method of measuring the angle of wind with respect to an aircraft, the method comprising:
    allowing airflow from one side to an opposite side of a fuselage of the aircraft wherein the airflow is through the fuselage; and
    measuring the rate of such airflow.

19. The method of claim 18 and further comprising utilization of the airspeed or dynamic pressure and altitude or static pressure data.

20. The method of claim 18 wherein allowing airflow comprises:
    installing ports that have an installation orientation with substantially opposing normal-surface vectors on the aircraft; and
    coupling the ports with pneumatic plumbing.

21. The method of claim 20 wherein airflow is measured with an airflow sensor incorporated in the pneumatic plumbing.

22. A method of measuring the angle of relative wind with respect to an aircraft's wing chord for determining AOA, the method comprising:
    allowing airflow between top and bottom surfaces on the aircraft via an enclosed airflow path; and
    measuring the rate of such airflow.

* * * * *